(12) United States Patent
Lepp et al.

(10) Patent No.: US 10,075,925 B2
(45) Date of Patent: Sep. 11, 2018

(54) CONTROLLING TRANSMISSION OF A WIRELESS DEVICE ASSOCIATED WITH MULTIPLE ACCESS POINTS

(71) Applicant: BLACKBERRY LIMITED, Waterloo (CA)

(72) Inventors: James Randolph Winter Lepp, Ottawa (CA); Stephen John Barrett, Heath (GB)

(73) Assignee: BlackBerry Limited, Waterloo, Ontario (CA)

( * ) Notice: Subject to any disclaimer, the term of this patent is extended or adjusted under 35 U.S.C. 154(b) by 85 days.

(21) Appl. No.: 14/794,195

(22) Filed: Jul. 8, 2015

(65) Prior Publication Data

US 2017/0013539 A1    Jan. 12, 2017

(51) Int. Cl.
| | |
|---|---|
| *H04W 52/30* | (2009.01) |
| *H04W 52/02* | (2009.01) |
| *H04W 52/14* | (2009.01) |
| *H04W 52/24* | (2009.01) |
| *H04W 74/08* | (2009.01) |

(52) U.S. Cl.
CPC ....... *H04W 52/30* (2013.01); *H04W 52/0229* (2013.01); *H04W 52/146* (2013.01); *H04W 52/243* (2013.01); *H04W 74/0816* (2013.01); *Y02D 70/00* (2018.01); *Y02D 70/1262* (2018.01); *Y02D 70/142* (2018.01); *Y02D 70/22* (2018.01); *Y02D 70/26* (2018.01)

(58) Field of Classification Search
CPC .. H04W 48/04; H04W 52/0229; H04W 52/30
See application file for complete search history.

(56) References Cited

U.S. PATENT DOCUMENTS

| | | | |
|---|---|---|---|
| 6,622,251 B1* | 9/2003 | Lindskog | H04L 29/06 370/328 |
| 2004/0136318 A1 | 7/2004 | Bentley | |
| 2008/0056133 A1* | 3/2008 | Deshpande | H04W 52/0216 370/235 |
| 2009/0028115 A1* | 1/2009 | Hirsch | G06Q 10/0637 370/337 |
| 2010/0085941 A1* | 4/2010 | Chin | H04W 36/0094 370/332 |
| 2010/0284380 A1* | 11/2010 | Banerjee | H04W 16/14 370/338 |

(Continued)

FOREIGN PATENT DOCUMENTS

WO    WO 2016089264 A1 *    6/2016    ............ H04W 28/08

OTHER PUBLICATIONS

Federal Communications Division, Guide, Specific Absorption Rate (SAR) for Cell Phones: What It Means For You dated Mar. 12, 2014 (2 pages).

(Continued)

*Primary Examiner* — Rina C Pancholi
(74) *Attorney, Agent, or Firm* — Trop, Pruner & Hu, P.C.

(57) ABSTRACT

A device decides to not transmit over a first wireless link between a wireless device and a first access point (AP), in response to determining that the wireless device is communicating or is about to communicate over a second wireless link with a second AP, wherein the wireless device is concurrently associated with the first and second APs.

19 Claims, 9 Drawing Sheets

(56) References Cited

U.S. PATENT DOCUMENTS

| | | | | |
|---|---|---|---|---|
| 2013/0065525 A1* | 3/2013 | Kiukkonen | ............ | H04W 52/36 455/41.2 |
| 2013/0155884 A1* | 6/2013 | Wang | ................ | H04W 72/1215 370/252 |
| 2015/0003403 A1* | 1/2015 | Mishra | .................. | H04W 56/00 370/330 |
| 2015/0023217 A1* | 1/2015 | Hu | ...................... | H04W 76/026 370/259 |
| 2015/0036514 A1 | 2/2015 | Zhu | | |

OTHER PUBLICATIONS

Wikipedia, Network Allocation Vector dated Nov. 2, 2014 (3 pages).

Wi-Fi Alliance, WiFi Alliance Technical Committee, WMM-Admission Control Technical Task Group, Wi-Fi Multimedia Technical Specification (with WMM-Power Save and WMM-Admission Control) Version 1.2.0, 2012 (45 pages).

Lepp et al., U.S. Appl. No. 14/699,484 entitled Randomized Beacon Transmissions filed Apr. 29, 2015 (36 pages).

Wi-Fi Alliance, WiFi Peer-to-Peer (P2P) Technical Specification, Verision 1.5, 2014 (183 pages).

Wifinigel.blogspot.co.uk, WiFi Nigel—How Much Air-Time Do Beacons Actually Burn? 2013 (3 pages).

Aruba Networks, White Paper, Improve Air Quality by Minimizing SSIDs: Using Role-Based Access to Increase Wi-Fi Application Performance, Oct. 2010 (16 pages).

IEEE Standards Association, IEEE Standard for Information technology—Telecommunications and information exchange between systems—Local and metropolitan area networks—Specific Requirements—Part 11: Wireless LAN Medium Access Control (MAC) and Physical Layer (PHY) Specifications, IEEE Computer Society, IEEE Std 802.11-2012, pp. 1-1162.

IEEE Standards Association, IEEE Standard for Information technology—Telecommunications and information exchange between systems—Local and metropolitan area networks—Specific Requirements—Part 11: Wireless LAN Medium Access Control (MAC) and Physical Layer (PHY) Specifications, IEEE Computer Society, IEEE Std 802.11-2012, pp. 1163-2695.

Canadian Intellectual Property Office, International Search Report and Written Opinion for PCT/CA2016/050755 dated Sep. 12, 2016 (9 pages).

* cited by examiner

CONTROLLING TRANSMISSION OF A WIRELESS DEVICE ASSOCIATED WITH MULTIPLE ACCESS POINTS

BACKGROUND

Devices such as computers, handheld devices, or other types of devices can communicate over wired or wireless networks. Wireless networks can include a wireless local area network (WLAN), which includes wireless access points to which devices are able to wirelessly connect.

BRIEF DESCRIPTION OF THE DRAWINGS

Some implementations of the present disclosure are described with respect to the following figures.

DETAILED DESCRIPTION

Figure 1:
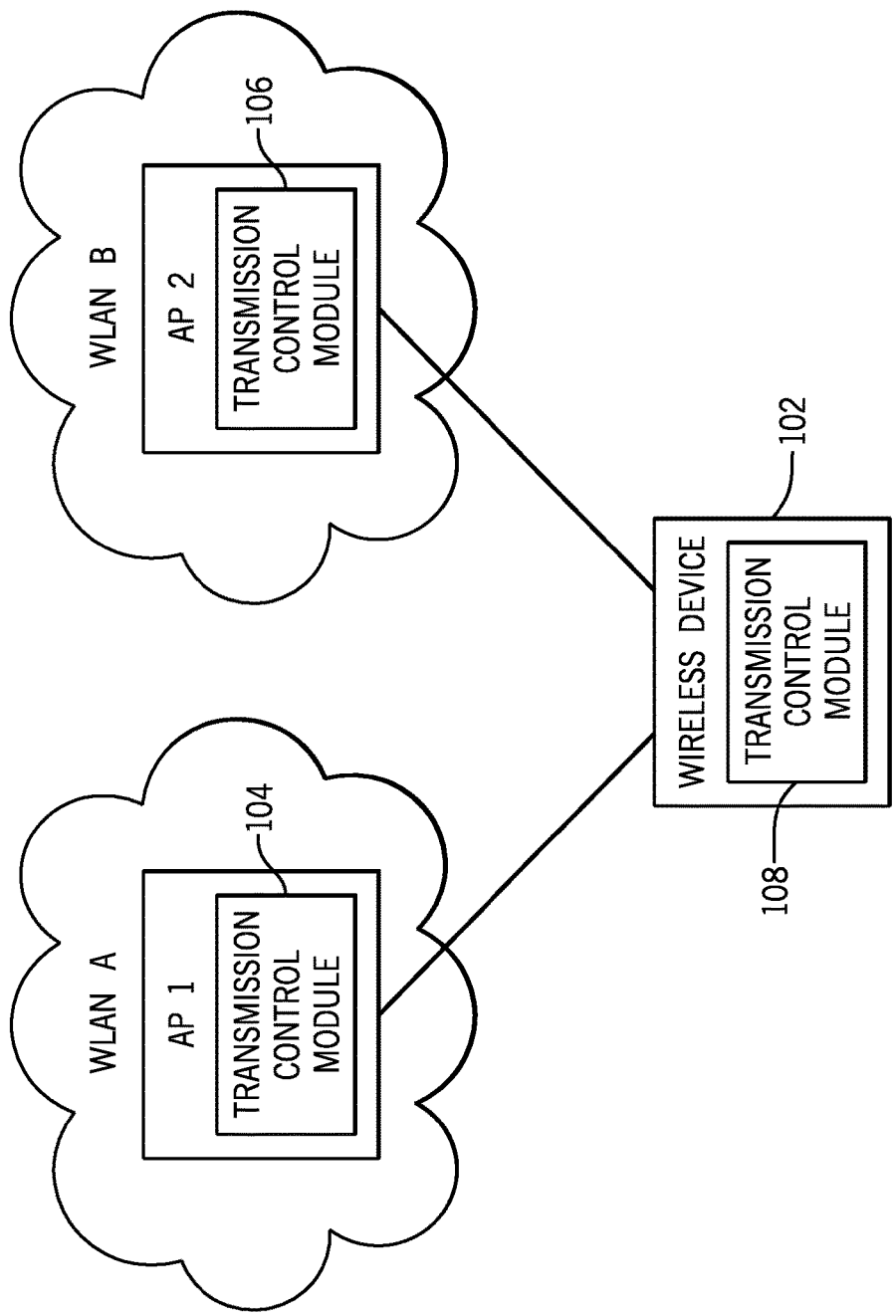
FIG. 1 is a block diagram of an example arrangement that includes wireless access points of a wireless local area network (WLAN), in some examples.

In some scenarios, a wireless device may communicate with multiple wireless access points (APs) of a wireless local area network (WLAN). A wireless AP (or more simply, an AP) can refer to a communication device to which a wireless device can establish a wireless connection to communicate with other endpoint devices. WLANs can include wireless networks that operate according to the Institute of Electrical and Electronic Engineers (IEEE) 802.11 Specifications. In other examples, WLANs can operate according to other protocols. Examples of wireless devices include computers (e.g. tablet computers, notebook computers, desktop computers, etc.), handheld devices (e.g. smartphones, personal digital assistants, wearable devices, etc.), game appliances, health monitors, vehicles (or equipment in vehicles), or other types of endpoint or user devices that are able to communicate wirelessly.

A scenario where a wireless device may communicate with multiple APs is one in which a cellular network operator offloads a portion of data traffic communications to a WLAN. A cellular network operator operates a cellular radio access network (RAN) that includes cells and associated cellular access network nodes. A wireless device within a cell can connect to a corresponding cellular access network node to allow the wireless device to communicate with other devices. A cellular RAN can operate according to the Long-Time Evolution (LTE) standards (or other standards) as provided by the Third Generation Partnership Project (3GPP). The LTE standards are also referred to as the Evolved Universal Terrestrial Radio Access (E-UTRA) standards. Although reference is made to LTE or E-UTRA, it is noted that techniques or mechanisms according to some implementations can be applied to other wireless access technologies, such as 5G (fifth generation) technologies.

Cellular network operators that provide cellular networks in licensed spectrum are running out of suitable new spectrum to purchase, and the spectrum that is available can be costly to license. Thus cellular network operators are looking for ways to extend cellular networks to use unlicensed spectrum. An unlicensed spectrum refers to frequencies that governments and regulators have set aside for wireless devices to use without a fee, so long as they can accept interference from other devices operating in the same spectrum. No single operator or network technology can claim exclusivity in this spectrum.

A way to expand the capacity of a cellular network is to make use of both the licensed spectrum and unlicensed spectrum (such as the spectrum used by a WLAN). In some cases, this can be accomplished by connecting wireless devices using two different protocols to two different types of networks (the cellular access network and the WLAN). Offloading of data traffic can refer to moving at least a portion of data communication from a cellular access network to a different network such as a WLAN, such that a portion of data traffic is communicated using the WLAN instead of the cellular access network, which allows for increased overall bandwidth for data traffic communications of the wireless device.

A cellular network operator is able to control a wireless device to cause the wireless device to be connected to an AP in a WLAN that is deployed by the cellular network operator. This ability of the cellular network operator to control the wireless device may conflict with a user's intended use and configuration for WLAN communications. As an example, a user may specify WLAN preferences such that the device is preferentially connected to an AP in the user's office WLAN. On the other hand, the cellular network operator may want the wireless device to be connected to an AP in an operator-deployed WLAN.

To address the foregoing, a wireless device can be configured to allow the wireless device to communicate with multiple APs, where one AP can be cellular network operator controlled and the other AP can be the AP that is user preferred. In this manner, both the cellular network operator and the user can have the WLAN connectivity specified respectively by the cellular network operator and the user.

A wireless device that is concurrently wirelessly connected to (also referred to as concurrently associated with) multiple APs can refer to the wireless device obtaining service from the multiple APs. A wireless device can be concurrently wirelessly connected to multiple APs while not communicating data simultaneously with the multiple APs. At any given instant in time, such as when just one channel is used, a wireless device can transmit data to or receive data from a first AP while not simultaneously communicating data with a second AP. In some circumstances however, it will also be possible to communicate at the same time to/from multiple APs (such as when different channels are used).

Although reference is made to connecting a wireless device to multiple APs in the context of WLAN-cellular interworking (where data traffic communication can be offloaded from a cellular access network node to a WLAN), it is noted that there can be other scenarios where a wireless device can concurrently connect to multiple APs (possibly in multiple respective WLANs).

FIG. 1 illustrates an example where a wireless device 102 is concurrently connected to multiple APs (AP 1 and AP 2) that are part of respective different WLANs (WLAN A and WLAN B). Although each WLAN A or B is depicted as including a respective single AP, it is noted that a WLAN can include multiple APs in some examples. Also, in other examples, the wireless device 102 can be concurrently connected to more than two APs.

In some cases, it is possible for the multiple APs to which the wireless device 102 is concurrently connected to operate on different channels of a same frequency band. Examples of frequency bands include the 2.4 Gigahertz (GHz) or the 5 GHz band. In other examples, there can be other frequency bands. A frequency band can have multiple channels, where each channel can refer to a respective different segment (frequency range between a first frequency and a second frequency) of the frequency band.

The following describes various issues that may be associated with a wireless device that is concurrently associated with multiple APs (which are part of respective different WLANs).

Issue 1

When a wireless device is associated with different WLANs operating on two different channels of the same frequency band, a concern is the possibility of a receiver of the wireless device operating in a first channel picking up interference from transmissions that the wireless device is making on a second channel. Such interference can be referred to as a transmitter-to-receiver radio frequency (RF) leakage (abbreviated as "Tx-to-Rx RF leakage"). For a wireless device that has a dual-radio design, the wireless device has two separate RF transceivers to allow the wireless device to transmit and receive on both channels at the same time. However, it may not be reliable to receive on a first channel while simultaneously transmitting on a second channel, since Tx-to-Rx RF leakage can occur.

Note that Tx-to-Rx RF leakage can also refer to in-device coexistence interference, which includes interference due to concurrent operation of a transmitter and a receiver in a wireless device.

Issue 2

SAR (Specific Absorption Rate) testing uses standardized models of the human head and body that are filled with liquids that simulate the RF absorption characteristics of different human tissues. To determine compliance, a wireless device is tested while operating at its highest power level in all the frequency bands in which the wireless device operates, and in various specific positions against the dummy head and body, to simulate the way different users typically hold a wireless device, including to each side of the head. To test wireless devices for SAR compliance, the wireless device can be precisely placed in various common positions next to the head and body, and a robotic probe takes a series of measurements of the electric field at specific pinpoint locations in a precise, grid-like pattern within the dummy head and body. All data for each wireless device placement are submitted as a part of the equipment approval test report for final authorization by a government entity or another regulatory or approval entity. However, only the highest SAR values for each frequency band are included in the final authorization to demonstrate compliance with RF guidelines.

SAR testing involves measuring the worst case scenario. A wireless device cannot exceed a certain maximum radiated power. For a wireless device with multiple RF transceivers capable of concurrent transmission, the ability to concurrently transmit has to be taken into consideration when performing SAR testing to ensure that operation of the multiple RF transceivers stay within the maximum SAR limits.

Issue 3

There are several options for concurrent association by a wireless device with multiple APs. As noted above, one option is for the wireless device to be concurrently associated with multiple APs that operate on different channels of the same frequency band.

Another option is for the wireless device to be concurrently associated with multiple APs that operate on the same channel of the same frequency band.

Yet another option is for the wireless device to be concurrently associated with multiple APs that operate on channels of different frequency bands (in other words, a first AP operates in a channel of a first frequency band, while a second AP operates in a channel of a second frequency band). A wireless device may have to decide which options to use for concurrently associating with multiple APs.

Solutions for Tx-to-Rx RF Leakage (Issue 2)

In some implementations, several solutions according to the present disclosure can be provided to prevent or mitigate Tx-to-Rx RF leakage.

Figure 2:
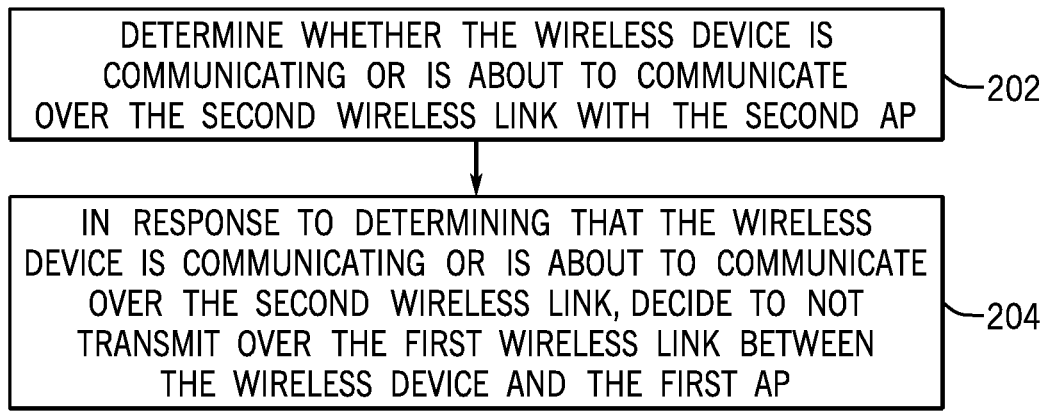
FIG. 2 is a flow diagram of an example process of a device, according to some implementations.

FIG. 2 is a flow diagram of a process that can be performed by a device according to some implementations to address the transmitter-to-receiver leakage. The device that can perform the process of FIG. 2 can include a wireless device or an AP.

The process of FIG. 2 is performed in the context of a wireless device that is concurrently associated with multiple APs, including a first AP and a second AP. The wireless device is able to communicate over a first wireless link with a first AP, and to communicate over a second wireless link with a second AP.

The process of FIG. 2 determines (at 202) whether the wireless device is communicating or is about to communicate over the second wireless link with the second AP. In response to determining that the wireless device is communicating or is about to communicate over the second wireless link with the second AP, the process of FIG. 2 decides (at 204) to not transmit over the first wireless link between the wireless device and the first AP.

The process of FIG. 2 can include any of several example solutions as discussed below.

Different solutions can be employed depending on respective states of legs between the wireless device and the respective APs. A "leg" between a wireless device and an AP can refer to a respective wireless link and/or a transceiver in the wireless device or AP. In the following example, it is assumed that leg A is for communications between the wireless device and a first AP, and leg B is for communications between the wireless device and a second AP.

Each leg can have a power save state or an active state. In the power save state, a corresponding transceiver in a wireless device or AP can be in a reduced functionality mode and is not communicating with the respective transceiver in the counterpart AP or wireless device. In the active state, the respective transceiver of the wireless device or AP is actively communicating (or is capable of actively communicating) with the respective transceiver in the counterpart AP or wireless device.

Table 1 below specifies different combinations of states of legs A and B, and respective example solutions that can be used to address Tx-to-Rx RF leakage issues.

TABLE 1

| Scenario | Leg A state | Leg B state | Addressed by which solution? |
|---|---|---|---|
| 1 | Power save state | Power save state | No solution used |
| 2 | Active state | Power save state | Solution C |
| 3 | Power save state | Active state | Solution C |
| 4 | Active state | Active state | Solution A or B |

Table 1 lists the four possible scenarios. Scenario 1 involves leg A having the power save state and leg B having the power save state. For scenario 1, no solution to address Tx-to-Rx RF leakage has to be employed since there is no Tx-to-Rx RF leakage issue, as the wireless device only has to receive on both legs A and B.

Scenario 2 involves leg A being in the active state and leg B being in the power save state. Scenario 3 involves leg A being in the power save state and leg B being in the active state. For either scenario 2 or 3, solution C discussed below can be used to address Tx-to-Rx RF leakage.

Scenario 4 involves both legs A and B being in the active state. To address Tx-to-Rx RF leakage in scenario 4, either solution A or solution B can be employed.

Solution A

Solution A generally involves performing gated downlink transmission by an AP in a first channel based on detecting that a wireless device is transmitting on a neighboring second channel. Gated downlink transmission can refer to controlled downlink transmission by the AP in which the AP can decide to transmit or not to transmit downlink information based on detecting that the wireless device is transmitting on the second channel. The gated downlink transmission of Solution A can be performed by a transmission control module 104 or 106 in respective AP 1 or AP 2 in FIG. 1.

For solution A, an AP (such as AP 1 and/or AP 2 in FIG. 3) is configured with RF transceivers to allow the AP to simultaneously transmit/receive on one channel while receiving on one or multiple other channels.

Figure 3:
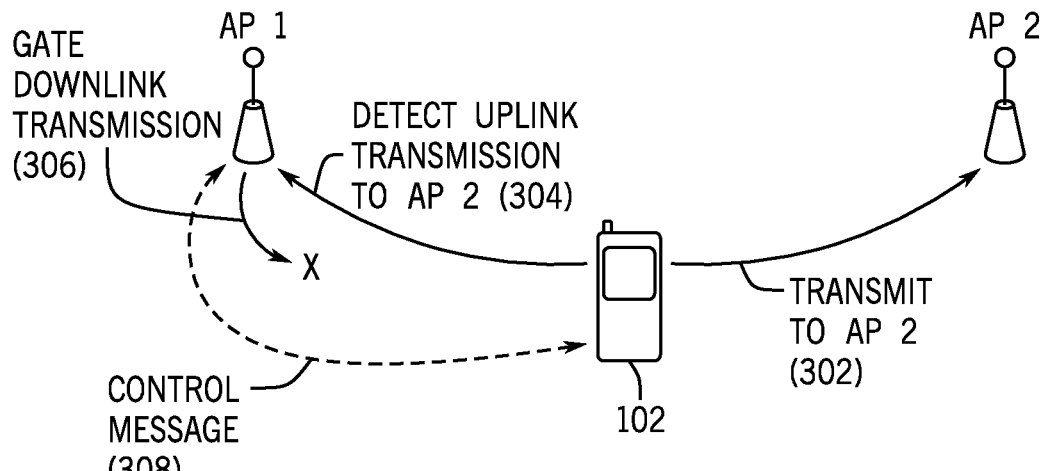
FIG. 3 is a schematic diagram of illustrating gated downlink transmission by an access point (AP), according to some implementations.

As shown in FIG. 3, the wireless device 102 transmits (302) uplink information to AP 2. The transmitted uplink information can include traffic data or control signalling. AP 1 detects (304) the uplink transmission (302) to AP 2. The detecting (304) corresponds to the determining (202) in FIG. 2 that the wireless device is communicating or is about to communicate wirelessly with the second AP.

In response to detecting (304) the transmission (302), AP 1 gates (306) a downlink transmission to the wireless device 102. Gating (306) the downlink transmission includes controlling the respective RF transceiver and/or a layer of AP 1 above the RF transceiver to prevent the downlink transmission in a respective channel to the wireless device 102. The gating (306) corresponds to deciding (204) in FIG. 2 to not perform transmission.

To enable AP 1 and/or AP 2 to perform gated downlink transmission to address RF leakage/interference issue discussed above, control messaging (308) can first be exchanged between the wireless device 102 and the given AP. The given AP can send an indication (in a control message such as pre-association signaling) to the wireless device 102 that the AP supports the solution to mitigate the RF leakage/interference issue. In response, the wireless device 102 sends an indication (in a control message as part of performing the association between the wireless device 102) to the given AP of concurrent association with multiple APs, so that the given AP can perform gated downlink transmission to mitigate RF leakage/interference due to uplink transmission by the wireless device 102.

More specifically, according to some examples, if the wireless device 102 uses different Medium Access Control (MAC) address identities for two different basic service sets (BSSs), the wireless device 102 can inform each AP supporting this solution of the MAC address the wireless device 102 is using on the other leg, and the channel and/or BSS identifier (BSSID) of the other BSS in which the wireless device 102 is operating (i.e. associated) at the time of association to the given AP, or when the association state changes with the other AP. A BSS includes zero or more non-AP stations (STAs) (such as wireless devices) that are connected to the same wireless AP. The BSSID can be the MAC address of the wireless AP.

In some examples, the wireless device 102 can inform the given AP of the wireless device's operation in the other BSS, and for example the BSSID of the AP in the other BSS, even if the wireless device 102 uses the same MAC address with both APs.

In operation (i.e. after association by the wireless device 102 with the APs), the wireless device 102 can adjust its uplink transmissions so that the uplink transmissions can be received by both APs. The adjustment can include selecting, by the wireless device 102, a transmit power level, a modulation and coding scheme (MCS), and so forth, so that the uplink transmissions are more likely to be received by the AP with the most challenging condition or restricted capability.

The wireless device 102 can determine whether to adjust an uplink transmission prior to performing the uplink transmission; for example, the wireless device 102 can determine not to increase the transmit power if the increase in transmit power would exceed a specified threshold.

While both APs are within range of the wireless device 102 (since the wireless device 102 is associated with both APs), one potential issue is that the APs have to listen on both the channels that the wireless device 102 is using. However, it is theoretically possible that the wireless device 102 is in coverage of an AP on one channel but not on another (because of the potential differences in radio propagation conditions and transmit power levels and MCS scheme applicable on the two channels). The adjustment of transmission parameters by the wireless device 102 can address the foregoing issue. There may be a reduction in system performance if such an approach were to be taken since the wireless device 102 may sometimes have to transmit at a higher power than it would otherwise have done (if the wireless device 102 were just trying to ensure that its signal was received by one AP). Therefore in some circumstances, it maybe more efficient just to accept the occasional collision and resulting re-transmission. The wireless device 102 can make a decision based on the expected performance of these two options and adjust the transmission parameters accordingly.

The detecting (304), by AP 1, of the uplink transmission to AP 2 can be based on various different information in some examples. The information that can be processed by the AP 1 to determine whether the wireless device 102 is communicating wirelessly or is about to communicate wirelessly with the AP 2 includes at least one selected from: a header of a frame transmitted by the wireless device 102 over the second wireless link to AP 2, an RTS message transmitted by the wireless device 102 over the second wireless link to the AP 2, a CTS message transmitted by the AP 2 to the wireless device 102 or a unique code prepended to an uplink transmission by the wireless device 102 over the second wireless link to the AP 2.

Note that the unique code may only be locally unique or statistically unique from a fixed set (large or small set) of codes. This is opposed to being globally unique (which is what MAC addresses are).

In more specific examples, the information in the header of a frame (e.g. a MAC frame) decoded by AP 1 can include a Duration field and MAC addresses sent by the wireless device 102 to AP 2. The Duration field can specify a time duration that the uplink transmission from the wireless device 102 to AP 2 is to occupy. The decoding of the Duration field and the MAC addresses allows AP 1 to determine whether the wireless device 102 is in communication on the other channel with another AP. In response to determining that the uplink transmission from the wireless device 102 to AP 2 is ongoing, AP 1 refrains from transmitting toward the wireless device 102 until the transmission to AP 2 has completed. Note that AP 1 would refrain, based on the decoded Duration field, from transmitting any data frames, but in addition may either allow or refrain from transmitting any control frames such as acknowledgement (ACK) or CTS responses based on the context. For example ACK messages may be transmitted because they are short in duration and cause less interference than data frames. Timely transmission of ACKs is also important for the overall system efficiency and to prevent retransmissions.

Figure 4:
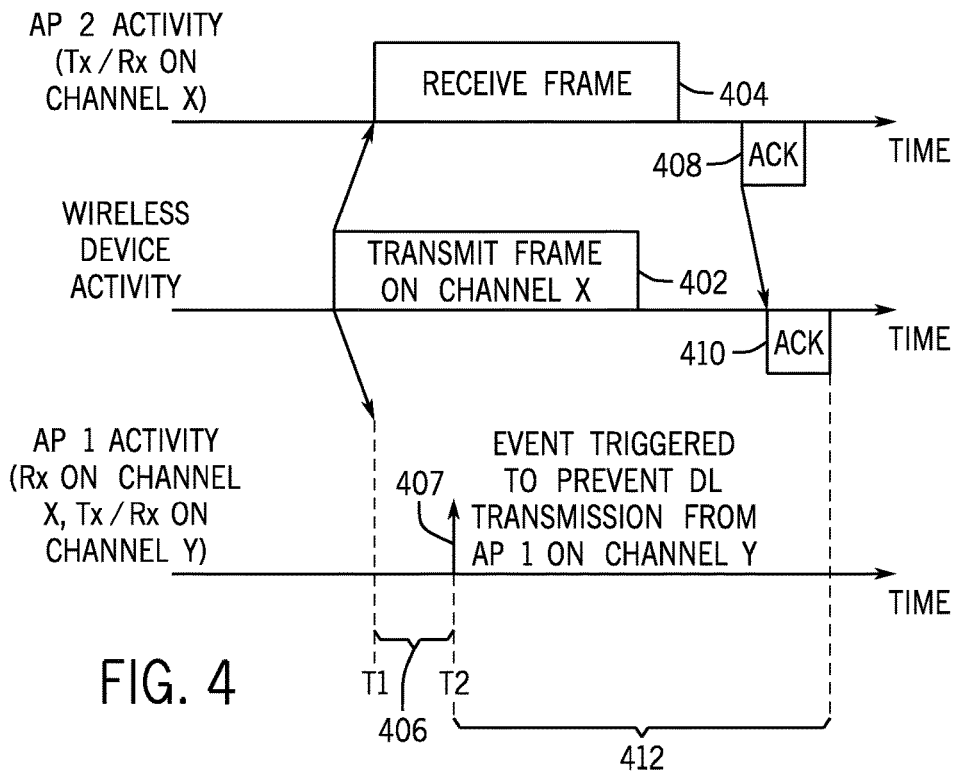
FIGS. 4 and 5 are timing diagrams of activities of a wireless device and APs, according to some examples.

FIG. 4 shows an example in which the wireless device 102 transmits (402) an uplink frame on channel X to AP 2, which is received (404) by AP 2. AP 1 detects the uplink frame on channel X at time T1. During a time interval 406 starting at T1, AP 1 decodes the header of the frame to determine whether the wireless device 102 is transmitting to AP 2. At time T2, the decoding triggers an event (407) in AP 1 to prevent downlink transmission by AP 1 in channel Y to the wireless device 102.

FIG. 4 also shows AP 2 transmitting (408) an acknowledgement (ACK) of the received frame (404). The ACK is received (410) by the wireless device 102. By using downlink transmission gating at AP 1 according to some implementations of the present disclosure, the possibility of the wireless device 102 simultaneously transmitting on channel X (to AP 2) and receiving on channel Y (from AP 1) is avoided during time interval 412. The time interval 412 starts at time T2 (when the event 407 occurred) and ends at a time corresponding to the end of the ACK (410) received by the wireless device 102. Alternatively, in some implementations the end of the time interval 412 does not include the ACK and thus it would end at the end of receive frame (404).

In other implementations, the wireless device 102 can operate in RTS/CTS (request to send/clear to send) mode when making transmissions in situations where RF leakage/interference is to be managed. In the RTS/CTS mode, if the wireless device 102 has data to send to an AP, the wireless device 102 first sends an RTS to the AP. If the AP responds with a CTS to the wireless device 102, then the wireless device 102 can send the data to the AP.

Figure 5:
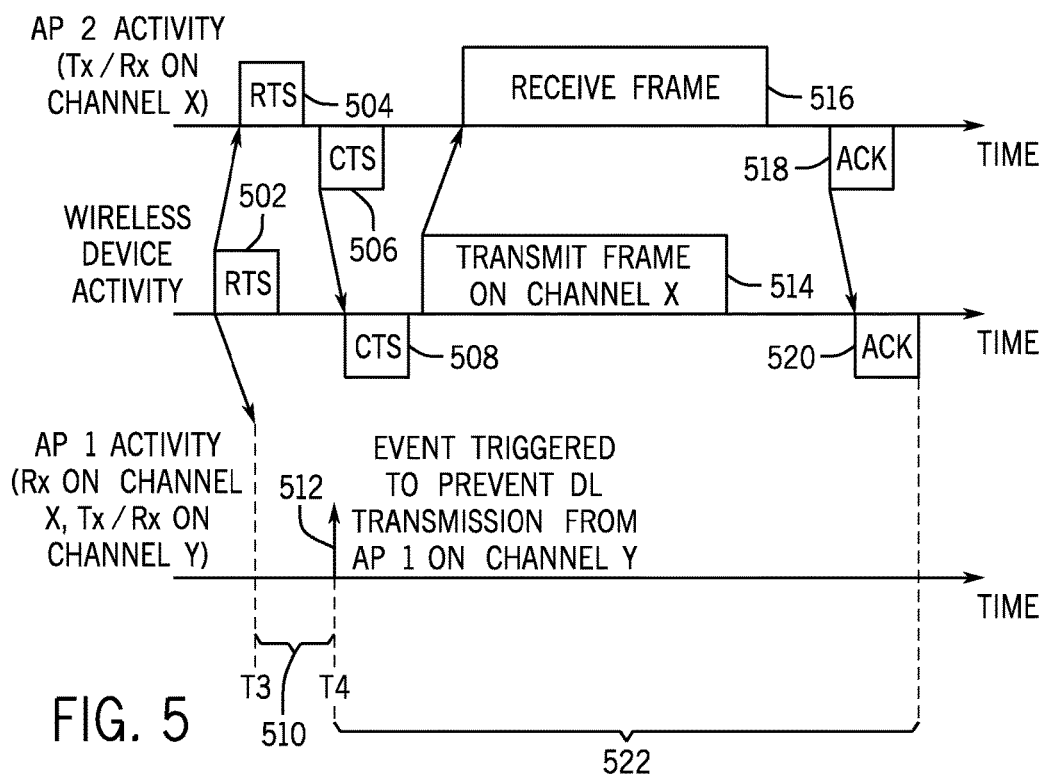

FIG. 5 shows an example where RTS/CTS mode is used. If the wireless device 102 has uplink data to send to AP 2 on channel X, the wireless device 102 first sends (502) an RTS to AP 2, which is received (504) by AP 2. In response, AP 2 sends (506) a CTS to the wireless device 102, which is received (508) by the wireless device 102.

AP 1 detects the RTS sent by the wireless device 102 at time T3, and AP 1 can decode the RTS in time interval 510 to determine whether the wireless device 102 is in communication or about to communicate on the other channel with AP 2. In response to decoding the RTS, AP 1 triggers, at time T4, an event (512) to prevent downlink transmission by AP 1 to the wireless device 102 on channel Y.

In response to receiving (508) the CTS from AP 2, the wireless device 102 transmits (514) an uplink frame on channel X to AP 2, which is received (516) by AP 2. In response to receiving (516) the uplink frame, AP 2 sends (518) an ACK, which is received (520) by the wireless device 102.

Alternatively, AP 1 can detect the CTS (508) sent by AP 2, and can gate downlink transmission based on the CTS. Reacting to CTS to gate downlink transmission by AP 1 can improve performance since it is more likely that the wireless device will actually make the uplink transmission (since AP 2 has not only received the request for uplink resources but has also granted permission for the uplink transmission). One difficulty though is that the APs may not be in range of one another (in contrast each AP is in range of the UE on at least one channel, so an AP is more likely to be able to hear the RTS).

Because of the short RTS/CTS exchange in advance of the transmission of the uplink frame by the wireless device 102, AP 1 (associated with the adjacent channel communication) has more time to determine that an uplink frame transmission is about to occur and thereby avoid making a downlink transmission. By using downlink transmission gating at AP 1 according to some implementations of the present disclosure, the possibility of the wireless device 102 simultaneously transmitting on channel X (to AP 2) and receiving on channel Y (from AP 1) is avoided during time interval 522. The time interval 522 starts at time T4 (when the event 512 occurred) and ends at a time corresponding to the end of the ACK (520) received by the wireless device 102. Alternatively, in some implementations the end of the time interval 522 does not include the ACK and thus it would end at the end of receive frame (516).

In other example implementations, an AP can assign to each associated wireless device a unique (within a BSS) code, which in some examples can be prepended to an uplink transmission to allow the receiving AP (which is supporting adjacent channel communications) to detect quickly (e.g. using a simple correlation receiver, for example) that an uplink transmission from the wireless device 102 is in progress. In some examples, the unique code can be a unique Orthogonal Frequency-Division Multiple Access (OFDMA) symbol. As noted above, the unique code can just be locally unique rather than globally unique.

The prepended unique code can be included in an overloaded VHT SIG-A field, for example. A VHT SIG-A field can be according to the IEEE 802.11ac Specification. The unique code in the overloaded VHT SIG-A field uniquely identifies a transmitter for receivers that are able to decode the unique code (using 64 quadrature amplitude modulation (QAM) for example), but conforms to a legacy value for stations that are only able to receive according to binary phase-shift keying (BPS K), for example.

Figure 6:
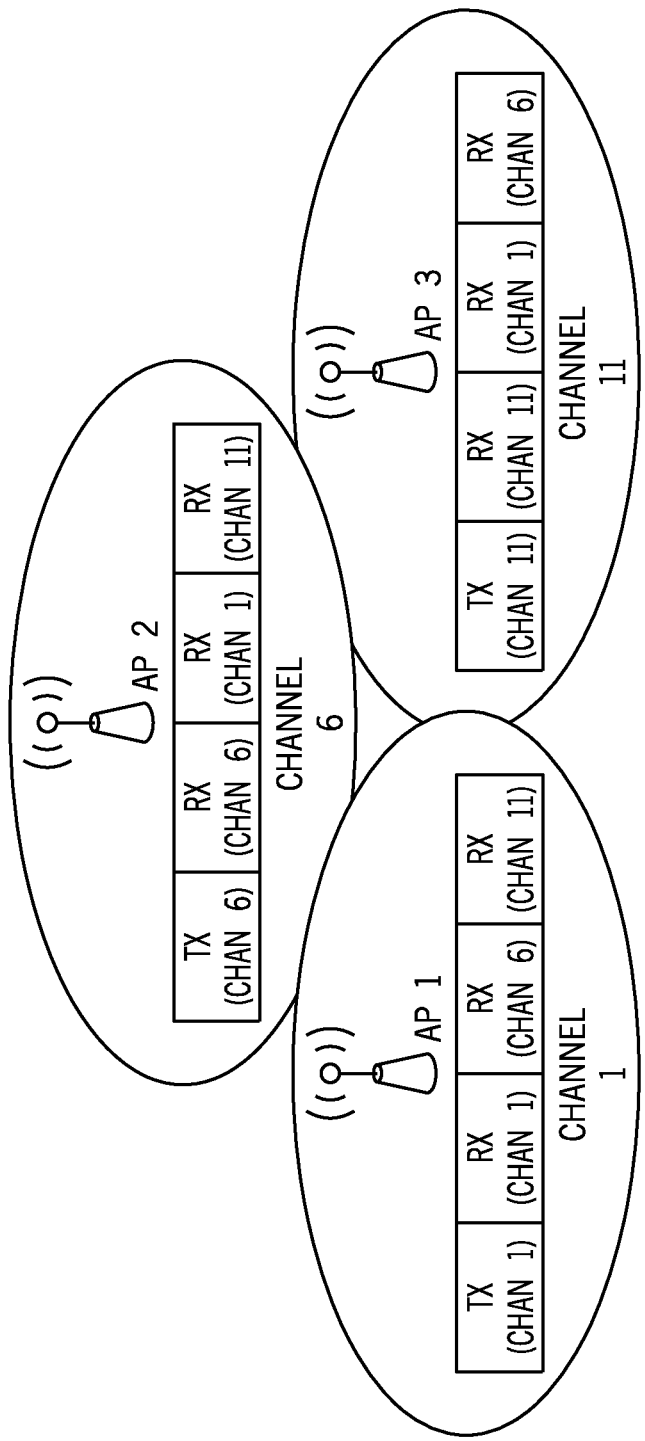
FIG. 6 is a schematic diagram of frequency use according to some implementations.

FIG. 6 shows an example network arrangement that includes AP 1, AP 2, and AP 3. An example frequency reuse pattern is implemented, in which AP 1 uses channel 1, AP 2 uses channel 6, and AP 3 uses channel 11. The frequency reuse pattern of FIG. 6 allows for management of RF interference. Each AP transmits on just one channel, but has multiple receivers to receive on respective multiple different channels (to in effect perform "carrier sensing" on the adjacent channels as discussed above to perform gated downlink transmission). For example, in FIG. 6, AP 1 can transmit on channel 1, and can receive on channels 1, 6, and 11; AP 2 can transmit on channel 6, and can receive on channels 6, 1, and 11; and AP 3 can transmit on channel 11, and can receive on channels 11, 1, and 6

In some implementations, each AP can process a Network Allocation Vector NAV) of its associated multiple-channel wireless devices (wireless devices that are associated with the AP) on both the AP's own BSS operating channel as well as the channel of the wireless device's other BSS.

The NAV is a virtual carrier-sensing mechanism used with wireless network protocols such as IEEE 802.11. The virtual carrier sensing is a logical abstraction that reduces having to implement physical carrier-sensing at the air interface to save power. MAC layer frame headers contain a Duration field that specifies the transmission time for the frame, during which time the wireless medium (channel) will be busy. The stations listening on the wireless medium read the Duration field and set their NAV accordingly, which is an indicator for a station on how long it has to defer from accessing the wireless medium Solution B Solution B generally involves performing gated uplink transmission (by the wireless device 192) on a first channel based on detecting that the wireless device 102 is receiving in a neighboring second channel. The gated uplink transmission according to Solution B can be performed by a transmission control module 108 in the wireless device 102, as shown in FIG. 1.

Figure 7:
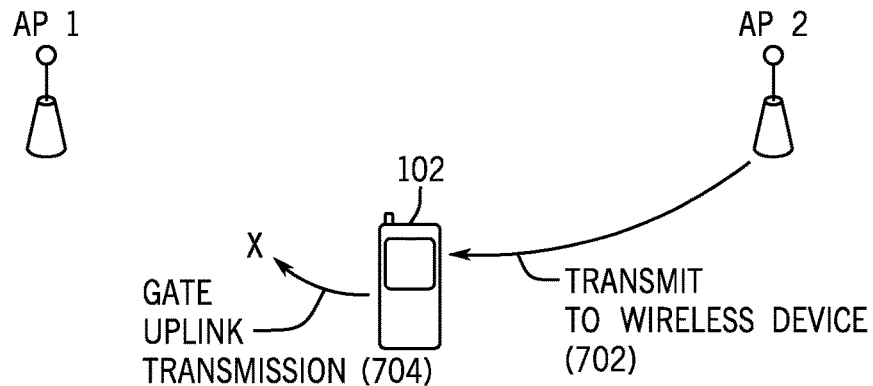
FIG. 7 is a schematic diagram of illustrating gated uplink transmission by a wireless device, according to further implementations.

As shown in FIG. 7, AP 2 transmits (702) downlink information to the wireless device 102. The wireless device 102 detects the downlink information, and in response, gates (704) an uplink transmission to AP 1. The gating (704) corresponds to task 204 in FIG. 2.

Also, with solution B, the determining (202 in FIG. 2) that the wireless device 102 is communicating or is about to communicate wirelessly with AP 2 includes processing, by the wireless device 102, selected information, including one or more of the following: a header of a frame or a unique identifying code prepended to a transmission from AP 2, where the unique identifying code identifies the wireless device 102. The header of the frame can be processed to determine whether the frame is targeted to the wireless device 102 from AP 2.

Alternatively, the determining (204 in FIG. 2) that the wireless device 102 is communicating or is about to communicate wirelessly with AP 2 includes determining, by the wireless device 102, that downlink transmission from AP 2 is expected in response to a previous transmission from the wireless device 102 to AP 2.

Figure 8:
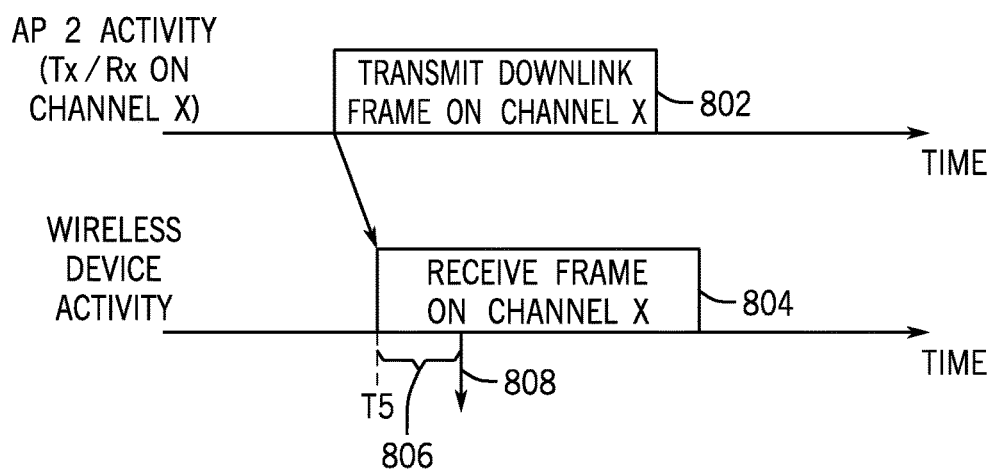
FIG. 8 is a timing diagram of example activities of a wireless device and APs, according to further examples.

There can be a delay while the wireless device 102 decodes the header of a downlink frame, and communicates a result of the decoding to the transmission control module 108 (FIG. 1) of the wireless device 102 that manages the gating of uplink transmissions. As shown in FIG. 8, AP 2 transmits (802) a downlink frame to the wireless device 102, which is received (804) by the wireless device 102. The decoding of the header of the downlink frame occurs starts at time T5, and after a time interval 806, the wireless device 102 is able to determine that the downlink frame is targeted to the wireless device 102. In response to this determination, the wireless device 102 triggers an event (808) to cause the wireless device 102 to gate (704 in FIG. 7) an uplink transmission. If the wireless device 102 initiates the uplink transmission during the time interval 806 during which the wireless device 102 is decoding the downlink frame header, then the unwanted situation can arise where the wireless device 102 is both transmitting and receiving on adjacent channels.

The foregoing issue can be mitigated in a number of ways, as discussed below.

First, the wireless device 102 can abort the uplink transmission as soon as the wireless device 102 detects on-going receiving of the downlink frame from AP 2. Such an approach can be combined with a more robust error coding technique applied to transmissions to potentially improve the chances that the downlink transmission (from AP 2) is decoded correctly even though there was a burst of interference caused by the Tx-to-Rx RF leakage from the uplink transmission.

Second, a unique identifying code of the wireless device 102 (e.g. Code Division Multiple Access (CDMA) code or higher order OFDMA symbol) can be prepended to transmissions to enable the wireless device 102 to determine more quickly that there is a relevant downlink transmission in progress (i.e. a downlink transmission targeted to the wireless device 102). This unique identifying code uniquely represents STAs in a BSS, but is not a globally unique identifier such as the MAC address.

In a variant solution 2, the wireless device 102 can determine that the wireless device 102 is expecting to receive a downlink message from an AP (e.g. AP 2), so that the wireless device 102 can avoid transmitting in the uplink on another BSS (i.e. to another AP such as AP 1). Examples of when the wireless device 102 is able to determine that the wireless device 102 is expecting to receive a downlink message from AP 2 are set forth below:

The wireless device 102 is expecting an ACK in response to a preceding uplink transmission to AP 2.

The wireless device 102 is expecting a CTS from AP 2 in response to an RTS sent to AP 2.

The wireless device 102 has received an RTS from AP 2 and has responded with a CTS to AP 2, and so the wireless device 102 should expect a downlink transmission from AP 2 to follow.

In some example cases it is possible that the wireless device 102 may have to transmit an uplink message as part of an atomic operation (e.g. transmit an ACK in response to receiving a downlink frame, or transmit a CTS in response to an RTS, etc.). In such cases it may not be possible to delay the uplink transmission since the counterpart device (e.g. AP 1) is expecting to receive the response message (ACK or CTS, for example) following a fixed duration, such as a Short Inter-Frame Spacing (SIFS). Since ACK messages and CTS messages are of short duration, they may cause a relatively short amount of interference. Such a short amount of interference can be mitigated to some extent by configuring the APs to use more robust interleaving and error coding technique for downlink transmissions in cases where the wireless device 102 is communicating with multiple AP's. An AP can be notified of a specification to use the more robust interleaving and error coding technique through signalling from the wireless device 102 during the association procedure of the wireless device 102 to the AP.

Solution C

Solution C generally involves managing Tx-to-RX RF leakage when one leg (of multiple legs between the wireless device 102 and respective APs) is in a power save state. Solution C can be used to address scenario 2 or 3 in Table 1 above.

When one leg is in a power save state, the mitigation of Tx-to-RX RF leakage involves to preventing the wireless device 102 from transmitting on the active leg (leg in active state) during a time when the wireless device 102 has to receive a periodic beacon on the power-save leg (leg in the power save state).

An AP can transmit a beacon (also referred to as a beacon frame). In some implementations, a beacon frame is a management frame according to the IEEE 802.11 Specifications. A beacon frame can contain various information about a WLAN. For example, the beacon frame can include capability information regarding the capability of an AP or the WLAN. The beacon frame can also indicate a type of network, such as an Ad Hoc or infrastructure network type. The beacon frame can also include a Service Set identifier (SSID) that identifies a network, information indicating supported data rates, and/or other information.

According to IEEE 802.11, beacon frames are transmitted by an AP periodically to announce the presence of a WLAN. Beacon transmissions can be infrequent (e.g. a beacon is transmitted every few hundreds of milliseconds) and can be of short duration (e.g. length of about 100-200 bytes). Typically, beaconing can take around 1% of airtime leaving 99% of the time for other operations.

With solution C, the MAC entity (an entity in a MAC layer) in the power save leg can notify the MAC entity on the active leg of time periods during which beacons are expected to occur, and can request that the MAC entity of the active leg refrain from uplink transmissions during these time periods. Since the time periods when the wireless device 102 is to receive beacons are predictable, a scheduler of the active leg can take into account the time periods when downlink beacon transmissions are expected to determine whether the active leg can be used to perform an uplink transmission. The time distance between expected beacon transmissions is known to the wireless device 102 (based on information pertaining to periodicity of the beacons), although it may be possible that a beacon transmission is delayed beyond a target time because beacon transmissions are subjected to IEEE 802.11 carrier sense multiple access with collision avoidance (CSMA/CA) procedures.

In some implementations, the wireless device 102 avoids making an uplink transmission until the beacon information, such as Beacon, Traffic Indication Map (TIM), Delivery TIM (DTIM), and so forth, has actually been received.

Figure 9:
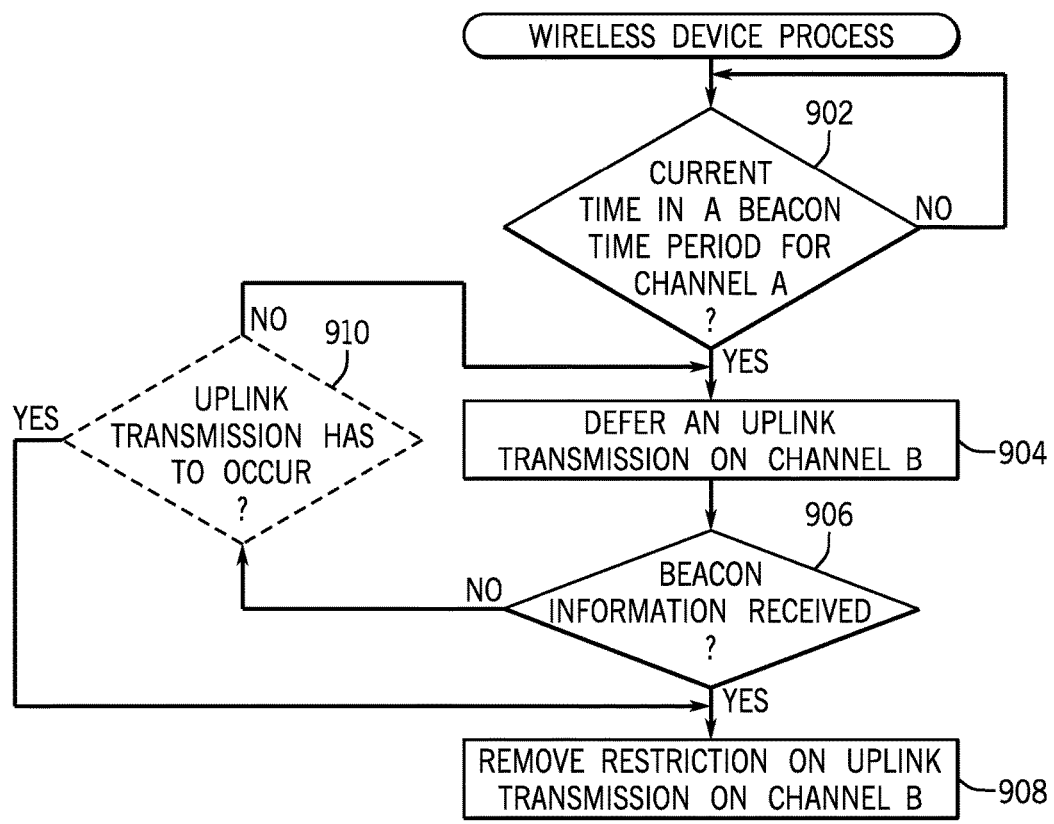
FIG. 9 is a flow diagram of an example process of a wireless device, according to yet further examples.

FIG. 9 is a flow diagram of a process that can be performed by the wireless device 102, such as by the transmission control module 108 in FIG. 1. In FIG. 9, it is assumed that channel A is the channel that is in the power save state.

The wireless device 102 determines (at 902) whether a current time is in a time period during which a downlink beacon is expected on channel A. If so, the wireless device 102 defers (at 904) an uplink transmission on channel B (the channel that has the active state).

If the wireless device 102 determines (at 906) that the beacon information has been received on channel A, then the wireless device 102 removes (at 908) the restriction on uplink transmission on channel B.

If the wireless device determines that the beacon information has not been received on channel A, the wireless device 102 continues to defer (at 904) an uplink transmission on channel B. In FIG. 9, task 910 can be an optional task that is not performed in some examples.

As noted further above, in some example cases, it may be possible that the wireless device 102 is unable to defer an uplink transmission if the uplink transmission has to be sent as part of an atomic operation which was initiated by an AP. In response to determining (at 910) that the uplink transmission has to occur, the wireless device 102 can be allowed to go ahead with the uplink transmission (by removing at 908 the restriction on uplink transmission) even though the uplink transmission is occurring in a time period when a downlink beacon is expected to be received. In such circumstance, the wireless device 102 may be unable to decode the beacon. However, missing an occasional beacon may not result in a fatal error.

Solution D

Solution D generally involves managing Tx-to-Rx RF leakage by increasing receive energy per bit.

The wireless device 102 first determines that the wireless device 102 is prone to Tx-to-Rx RF leakage given the channels on which the wireless device 102 is operating. For example, in the 5 GHz band, there may be enough separation between two channels at opposite ends of the band that there is no in-device coexistence interference issue, while other channel pairs do exhibit interference. The wireless device 102 can identify channel pairs for which interference mitigation is to be applied.

The wireless device 102 can identify such channel pairs using any of the following mechanisms, in some examples.

A table can be provided in the wireless device 102, such as at the time of manufacture or at a time of configuration of the wireless device 102 by a network or at some other time. The table can identify the channel pairs for which Tx-to-Rx RF leakage has to be mitigated. Interference mitigation can include application of any of the measures described further below or above (e.g. Solutions A-C).

The wireless device 102 can insert a test transmit signal on a first channel and measure a received signal on a neighboring second channel of concern to determine whether Tx-to-Rx RF leakage is an issue to be managed. This sort of self-calibration can be used to selectively apply the measures below or above.

The wireless device 102 can take any or some combination of the following measures:

a) The wireless device 102 can reduce its maximum uplink transmit power.

b) The wireless device 102 can request an AP to use a lower order MCS (modulation and coding scheme) for frames transmitted from the AP to the wireless device 102. This will result in the AP using a channel code with better levels of protection in addition to the use of a lower order modulation scheme for the transmission of downlink frames, to better enable the wireless device 102 to correctly receive a downlink frame (even in the presence of the unwanted RF leakage power).

a. A mechanism can be provided for the wireless device 102 to negotiate the MCS that an AP uses for downlink transmissions. A management frame or control frame is transmitted from the wireless device 102 to the AP to update the set of supported MCSs. When the wireless device 102 is in a leakage scenario (e.g. the wireless device 102 is communicating on channels in one of the identified channel pairs for which Tx-to-Rx RF leakage is an issue), the wireless device 102 sends a list of only the lower order MCSs.

When the wireless device 102 is no longer in the leakage scenario (e.g. the wireless device 102 is no longer concurrently associated with multiple APs or is no longer communicating on channel pairs for which Tx-to-Rx RF leakage is an issue), the wireless device 102 sends an update to the AP that the full set of supported MCSs can be used. This solution can be used in conjunction with Solutions A and B (since in those solutions the avoidance of overlapping Tx and Rx cannot always be achieved, e.g. atomic operations, or there may be a period of overlap before the detection of the problem is completed).

Solution to Satisfy a SAR Limit (Issue 1)

Regulatory limits for Specific Absorption Rates (SAR) in body tissues can be given in watts per kilogram (W/Kg), for example. For any given RF transceiver operating in a given band, with given directionally dependent antenna gain, and for a given device-to-body spatial relationship (e.g. wireless device held against the head), a respective maximum acceptable device transmit power can be specified.

If multiple transmitters are capable of transmitting simultaneously, the cumulative effect on SAR should be accounted for. The management of aggregate transmit power can involve scheduling uplink frames in a way that takes into account CSMA rules.

In addition to managing the cumulative SAR caused by the wireless device 102 transmitting to multiple APs, the wireless device 102 can also coordinate with other (non-WLAN) RF transceivers, such as an LTE transceiver, in the wireless device 102.

To ensure that SAR levels are not exceeded when there are multiple RF transmitters, it is possible to use a combination of techniques, such as for example, delaying transmission of data, lowering power levels of transmission to one or more APs, and/or aborting transmission to one AP so that transmission to another AP can start.

Figure 10:
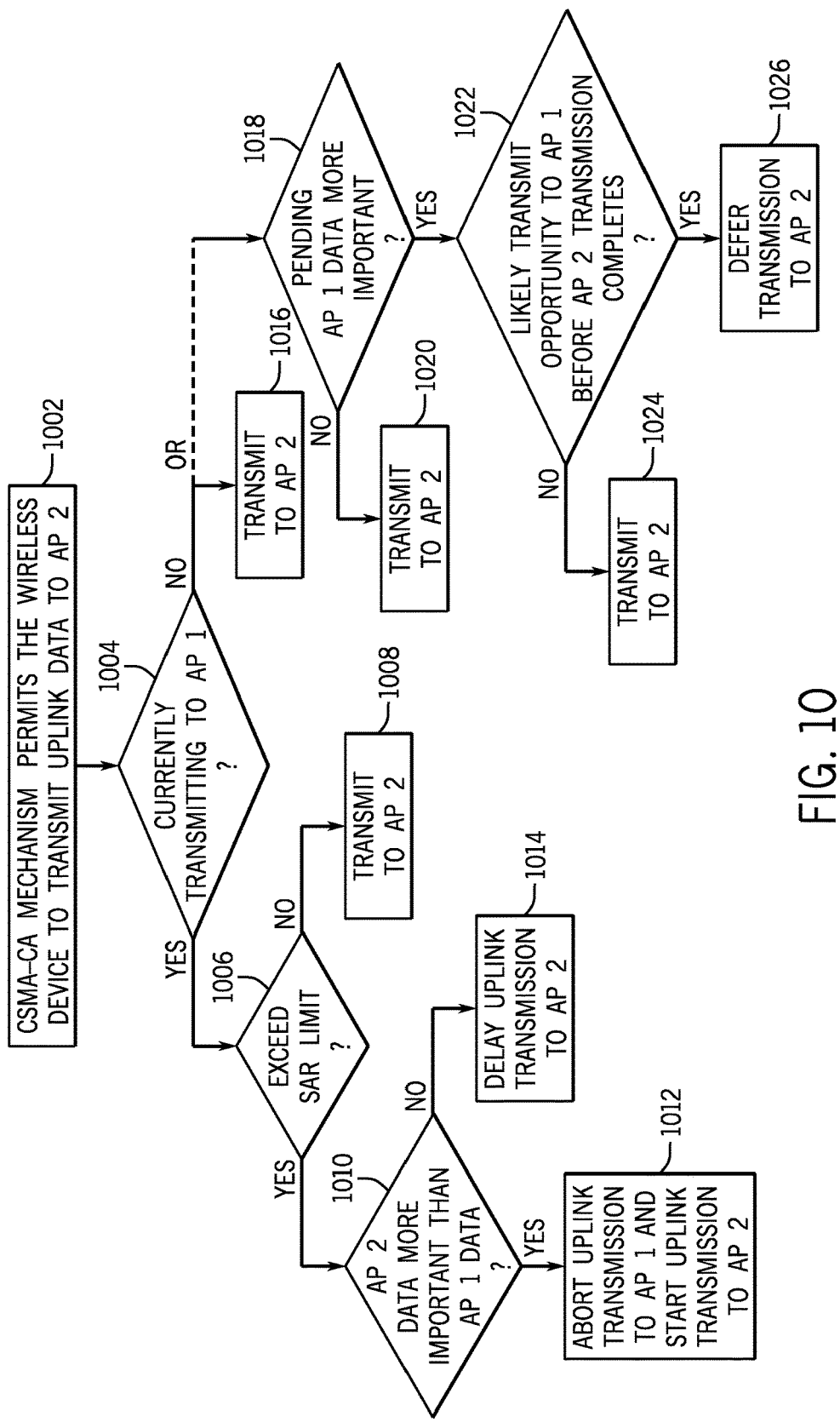
FIG. 10 is a flow diagram of an example process to manage uplink transmissions to APs while taking into account both carrier sense multiple access with collision avoidance (CSMA-CA) conditions and Specific Absorption Rate (SAR) limits, according to alternative implementations.

An example process of the wireless device 102 is depicted in FIG. 10. The process of FIG. 10 can manage uplink transmissions to two APs while taking into account both CSMA-CA conditions and SAR limits.

A CSMA-CA mechanism in the wireless device 102 permits (at 1002) the wireless device 102 to transmit uplink data to AP 2. The wireless device 102 determines (at 1004) whether the wireless device 102 is currently transmitting uplink data to AP 1.

If so, the wireless device 102 determines (at 1006) whether a SAR limit would be exceeded if the wireless device 102 also transmits uplink data to AP 2. If the SAR limit would not be exceeded, the wireless device 102 transmits (at 1008) the uplink data to AP 2.

However, if the wireless device 102 determines (at 1006) that the SAR limit would be exceeded, the wireless device 102 determines (at 1010) whether the uplink transmission to AP 2 is more important than the on-going uplink transmission to AP 1. Uplink data to AP 2 may be more important than uplink data to AP 1 if for example the uplink data to AP 2 has time to expire constraint that is shorter than the uplink data to AP 1, or if the uplink data to AP 2 has a higher quality of service level than the quality of service level for the uplink data to AP 1.

In response to the wireless device 102 determining (at 1010) that the uplink transmission to AP 2 is more important than the on-going uplink transmission to AP 1, the wireless device 102 aborts (at 1012) the on-going uplink transmission to AP 1 and starts the uplink transmission to AP 2.

However, in response to the wireless device 102 determining (at 1010) that the uplink transmission to AP 2 is not more important than the on-going uplink transmission to AP 1, the wireless device 102 delays (at 1014) the uplink transmission to AP 2 until the next opportunity to transmit afforded by the CSMA mechanisms provided by AP 2 that occurs after the uplink transmission to AP 1 has completed.

In response to determining (at 1004) that the wireless device 102 is not currently transmitting uplink data to AP 1, the wireless device 102 either (1) transmits (at 1016) the current uplink data to AP 2 or (2) determines (at 1018) whether pending uplink data to AP 1 stored in a queue of the wireless device 102 is more important (using similar criteria as used at task 1010) than the current uplink data to be transmitted to AP 2.

In response to the wireless device 102 determining (at 1018) that pending uplink data to AP 1 stored in the queue of the wireless device 102 is not more important than the current uplink data to be transmitted to AP 2, the wireless device transmits (at 1020) the current uplink data to AP 2.

However, in response to the wireless device 102 determining (at 1018) that pending uplink data to AP 1 stored in the queue of the wireless device 102 is more important than the current uplink data to be transmitted to AP 2, the wireless device 102 determines (at 1022) whether there is likely to be a transmit opportunity to AP 1 before transmission to AP 2 would complete. The wireless device 102 can make this assessment based on one or more factors including:

A current back-off timer value on the wireless device 102's link to AP 1 (if the back-off timer is long then there is a better chance of completing the transmission to AP 2 before a transmission opportunity towards AP 1 becomes available;

Channel availability for transmission to AP 1 based on NAV information received by the wireless device 102;

The throughput achievable to AP 2 (if transmission to AP 2 can occur relatively quickly, then the chance of missing a transmit opportunity to AP 1 is less.

In response to the wireless device 102 determining (at 1022) that there is not likely to be a transmit opportunity to AP 1 before transmission to AP 2 would complete, the wireless device 102 transmits (at 1024) the uplink data to AP 2.

However, in response to the wireless device 102 determining (at 1022) that there is likely to be a transmit opportunity to AP 1 before transmission to AP 2 would complete, the wireless device defers (at 1026) transmitting the uplink data to AP 2 until after the transmission of the uplink data to AP 1 has occurred.

As discussed above, some uplink transmissions of the wireless device 102 are part of atomic operations. For example, such uplink transmission can include an ACK in response to a downlink data transmission, or the transmission of a CTS in response to an RTS. In these examples, an AP expects to receive a response within a fixed time interval.

If the wireless device 102 has to, or is given the opportunity to, transmit on both legs at the same time to multiple APs, and one or more of the uplink transmissions include a response (e.g. ACK or CTS) of an atomic operation, then:

i) If both uplink transmissions are part of atomic operations:

the wireless device 102 transmits both uplink transmissions if they are both short transmissions (e.g. ACK and/or CTS) that are unlikely to significantly impact the long-term SAR average, or the wireless device 102 transmits the ACK in preference to the CTS (failure of ACK transmission would cause retransmission of the preceding data frame; failure of CTS would cause retransmission of the much-shorter RTS transmission).

ii) If only one of the uplink transmissions is part of an atomic operation:

the wireless device 102 follows the procedure of FIG. 10, or the wireless device 102 defers the uplink transmission that is not a response in an atomic operation.

Solution for Selecting an Option for Concurrent Association with Multiple APs (Issue 3)

As discussed above, there are several options for concurrent association by the wireless device 102 with multiple APs. One option (dual channel/single band option) is for the wireless device 102 to be concurrently associated with multiple APs that operate on different channels of the same frequency band. Another option (single channel option) is for the wireless device 102 to be concurrently associated with multiple APs that operate on the same channel of the same frequency band. Yet another option (dual channel/dual band option) is for the wireless device 102 to be concurrently associated with multiple APs that operate on channels of different frequency bands.

The selection of one of the three options to use can be dependent on one or more of the following factors:

On which channels and which bands each of the WLANs are available:

WLANs can be associated with profiles such as an Enterprise network profile, a Cellular Operator network profile, and a Home network profile, and can provide access to different services.

APs or clusters of APs operating in a WLAN (Extended Service Set or ESS) can be configured to operate using multiple channels on the same band or across bands. Sometimes these are implemented as arrays containing multiple of RF transceivers. Thus the same network may be available on more than one channel.

Figure 11:
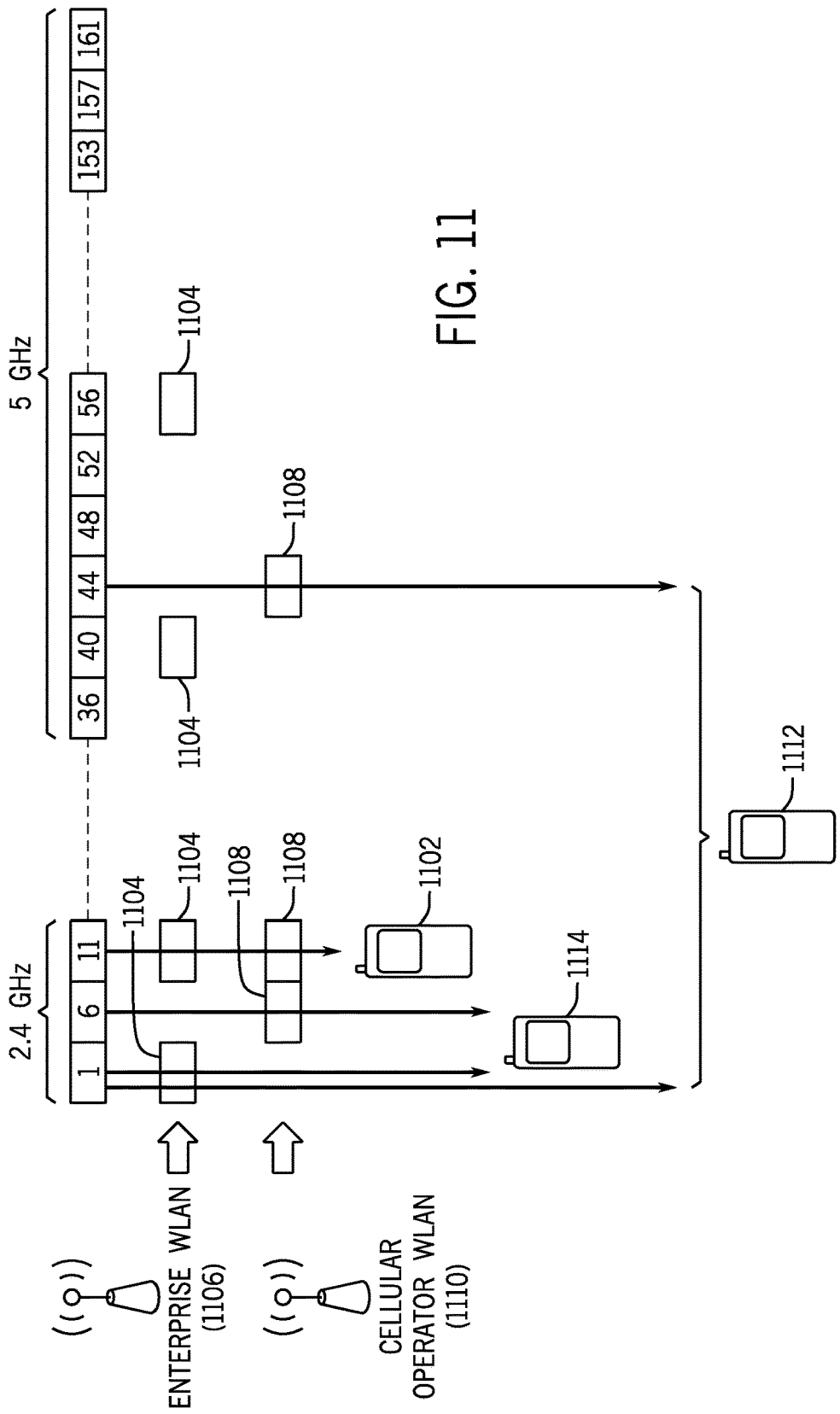
FIG. 11 illustrates different wireless devices capable of using different options for associations with multiple APs, according to some implementations.

The capability of a wireless device:

A wireless device may support just one PHY (i.e only one RF/baseband Tx-Rx chain), and may only support a same channel/same band configuration. Such a wireless device is depicted as 1102 in FIG. 11, which is able to communicate over just channel 11 in the 2.4 GHz band. FIG. 11 also shows channels (1, 6, 11) of the 2.4 GHz band and channels (36, 40, . . . , 161) of the 5 GHz band. FIG. 11 also shows the channels 1104 employed by an Enterprise WLAN 1106, and the channels 1108 employed by a Cellular WLAN 1110.

A wireless device may support simultaneous communication over two different bands (two separate MAC/PHYs and two separate RF front ends). Such a wireless device is depicted as wireless device 1112 in FIG. 11, which is able to communicate over channel 1 in the 2.4 GHz band, and channel 44 in the 5 GHz band.

A wireless device may support one band but can simultaneous use two channels in that band. Such a wireless device is illustrated as 1114 in FIG. 11, which is able to communicate over channels 1 and 6 of the 2.4 GHz band.

A wireless device may support some combination of the above capabilities with various constraints (for example, the wireless device can support two simultaneous channels in 5 GHz, but only if they are sufficiently separated such as one below 5350 MHz and the other above 5470 MHz).

Preferences:

In the event that multiple options are possible, a prioritization technique or mechanism can be provided to prioritize one option over another option.

Assume a wireless device is capable of all three options:

The dual channel/dual band option may be set as the most preferred option, since this option is likely to increase overall throughput to the wireless device with reduced in-device coexistence interference and reduced coordination complexities. This option can also increase the aggregate throughput across channels.

The single channel option may be set as the most preferred option, as this option may allow power savings by only operating one RF transceiver on one channel, and some of the active state time may overlap, which increases efficiency.

Whether or not single channel operation is preferred over dual channel/same band operation may be a little harder to ascertain a priori.

An issue of single channel operation is that overall throughput may be reduced, but there may also be reductions on aggregate throughput achievable with dual channel/same band operation (depending on solutions that can be employed, and, for example, whether throughput may be reduced by a selected technique to mitigate Tx-to-Rx RF leakage).

Potentially other factors can also be considered, such as relative radio quality and/or radio or backhaul load of the various APs running in two (or more) ESS's.

The preferences can be expressed as a relative ranking of the three options.

One ranking is a ranking for achieving maximum throughput across the two WLANs. This would be for wireless devices desiring the highest throughput and lowest latency. The three options can be ranked in the following order: 1) dual channel/dual band option, 2) dual channel/single band option, and 3) single channel option.

Another ranking is a ranking for achieving maximum power efficiency. This would be for wireless devices or applications with strict battery constraints and lower throughput specifications. The three options can be ranked in the following order: 1) single channel, 2) dual channel/single band, 3) dual channel/dual band.

Whether there is existing connectivity to an AP:

If the wireless device is already associated with an AP on a certain band or channel, this is a factor in deciding suitability of association with a second AP. If the wireless device is connected to first AP (of a first WLAN) but wishes to add connectivity to a second AP, then the following can be performed:

The wireless device continues to use the channel/band that the wireless device is currently using for the first AP and picks the best of the available band/channels for the second AP.

The wireless device allows itself to pick the most preferred combination of channel/bands even if this means re-associating to another channel/band on the first WLAN.

A process for selecting band(s)/channel(s) on which to communicate to each AP is discussed below. Such a process can be triggered either in response to:

the wireless device switching on, such as for example when service provided by both a first WLAN and a second WLAN has to be activated; or in response to adding the "service" of the second WLAN. A WLAN's "service" being added may be triggered by requests of an application, due to offloading from a cellular network, or based on regular periodic scans that detect new networks available in range.

The tasks of the process by the wireless device for selecting band(s)/channel(s) are shown below.

Task 1) Scan all bands to determine a complete set of channels on which a first WLAN and a second WLAN are supported (e.g. whether an AP is an Enterprise AP or a Cellular Operator AP may be deduced by the wireless device based on preconfigured WLAN profiles and information broadcast by the AP).

Task 2) Given the wireless device's capabilities (capability to support the dual channel/dual band option, capability to support the dual channel/single band option, and capability to support the single channel option), the wireless device builds a list of all available channel/band options/combinations.

Task 3) The wireless device picks the most preferred combination.

Task 4) The wireless device associates with one or two 802.11 BSS's on the most preferred bands/channels.

This may involve re-associating to another band/channel if already camped on an AP for the purpose of receiving one of the services.

In some examples, there are several ways to implement Task 3 and the selection of the most preferred combination of channels/bands. The sub-tasks of Task 3 according to an example are set forth below:

Task 3.1) The wireless device picks the dual channel/dual band option if available and supported.

If multiple channel combinations are possible (across the two bands), pick the channel on each band which is the best based on radio/load conditions.

Go to End.

Task 3.2) The wireless device picks the dual channel/single band option if available and supported.

If multiple channels are available, pick the band/set of channels which would result in the channels having sufficient frequency separation such that Tx-to-Rx RF leakage can be considered insignificant, and which would give the best quality of experience (e.g. best aggregated throughput).

If multiple channels are available, but there is no pair of channels which would result in the channels having sufficient frequency separation such that Tx-to-Rx RF leakage can be considered insignificant, then pick the band/set of channels which would give the best estimated quality of experience (e.g. best estimated aggregated throughput).

Go to End.

Task 3.3) The wireless device picks the same channel option.

If multiple channel options exist pick the channel expected to deliver best quality of experience (e.g. with highest estimated available throughput).

Task 3.4) End.

System Architecture

Figure 12:
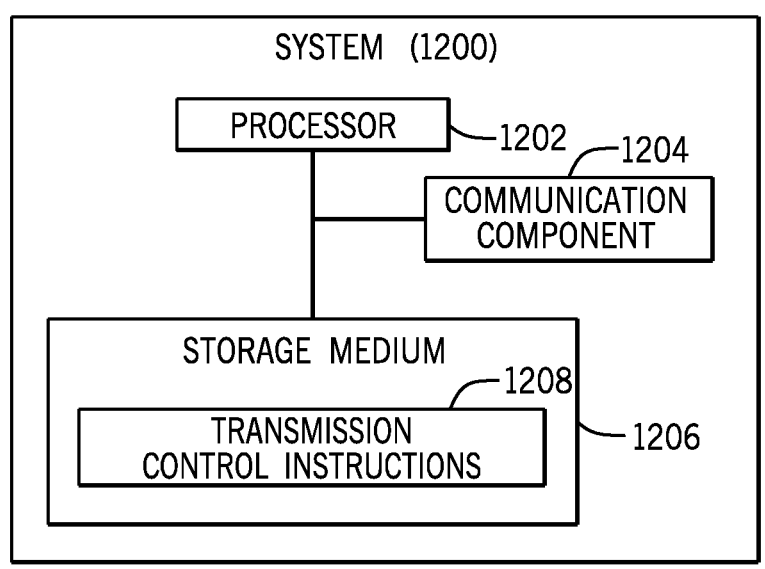
FIG. 12 is a block diagram of an example wireless node according to some implementations.

FIG. 12 is a block diagram of an example system (or network node) 1200, which can represent any one of: a device (e.g. wireless device 102) or an AP (e.g. AP 1 or 2). The system 1200 can be implemented as a computing device or an arrangement of multiple computing devices.

The system 1200 includes a processor (or multiple processors) 1202, which can be coupled to a communication component (or multiple communication components) 1204 to communicate with another entity, either wirelessly or over a wired link. A processor can include a microprocessor, a microcontroller, a physical processor module or subsystem, a programmable integrated circuit, a programmable gate array, or another physical control or computing circuit.

The processor(s) 1202 can also be coupled to a non-transitory machine-readable or computer-readable storage medium (or storage media) 1206, which can store transmission control machine-readable instructions 1208 that are executable on the processor(s) 1202 to perform various tasks as discussed above.

The storage medium (or storage media) 1206 can include one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of a wireless device, comprising:

setting a first transceiver to a first wireless link between the wireless device and a first access point (AP) in an active state;

setting a second transceiver to a second wireless link between the wireless device and a second AP in an active state, wherein each of the first and second transceivers in the respective active state is able to transmit and receive over a respective wireless link of the first and second wireless links;

while the first transceiver is set in the active state of the first transceiver and the second transceiver is set in the active state of the second transceiver, deciding, by at least one processor in the wireless device, to not transmit over the first wireless link between the wireless device and the first AP, in response to determining that the wireless device is communicating or is about to communicate over the second wireless link with the second AP, wherein the wireless device is concurrently associated with the first and second APs using a same protocol, wherein the first AP is part of a first network and the second AP is part of a second network different and separate from the first network, and wherein one network of the first network and the second network is provided by a cellular network operator that has allocated the first network to offload communication of data traffic from a cellular network of the cellular network operator; and in response to deciding to not transmit over the first wireless link, controlling the first transceiver to prevent transmission over the first wireless link while the first transceiver is in the active state of the first transceiver.

2. The method of claim 1, wherein the deciding to not transmit comprises deciding to not transmit uplink information to the first AP.

3. The method of claim 2, wherein the determining that the wireless device is communicating or is about to communicate wirelessly with the second AP comprises processing, by the wireless device, a header of a frame and determining based on the header that the frame is targeted to the wireless device from the second AP.

4. The method of claim 2, wherein the determining that the wireless device is communicating or is about to communicate wirelessly with the second AP comprises processing, by the wireless device, a unique identifying code prepended to a transmission from the second AP, the unique identifying code identifying the wireless device.

5. The method of claim 2, wherein the determining that the wireless device is communicating or is about to communicate wirelessly with the second AP comprises determining, by the wireless device, that a downlink transmission from the second AP is expected in response to a previous transmission from the wireless device to the second AP.

6. The method of claim 1, further comprising:
proceeding, by the wireless device, with an uplink transmission to the first AP even though the wireless device is receiving or about to receive a downlink transmission from the second AP, in response to determining that the uplink transmission comprises information that cannot be delayed.

7. The method of claim 1, wherein the determining that the wireless device is communicating or is about to communicate wirelessly with the second AP comprises determining, by the wireless device, that a beacon transmission is expected from the second AP.

8. The method of claim 7, wherein the deciding to not transmit over the first wireless link between the wireless device and the first AP comprises restricting transmission of information over the first wireless link until the beacon transmission has been received over the second wireless link.

9. The method of claim 1, further comprising:
identifying, from among a plurality of channels, pairs of channels that exhibit interference; and
in response to use of a given pair of the identified pairs of channels, requesting by the wireless device, at least one AP associated with the given pair of channels to use a lower order modulation and coding scheme (MCS).

10. The method of claim 1, further comprising:
determining, by the wireless device, whether concurrent transmissions by the wireless device to a plurality of APs would exceed a Specific Absorption Rate (SAR) threshold; and
in response to determining that concurrent transmissions by the wireless device to the plurality of APs would exceed the SAR threshold, abort or delay or reduce a transmission power of at least one transmission to at least one of the plurality of APs.

11. The method of claim 1, further comprising:
selecting one of a plurality of options for concurrent transmissions to a plurality of APs, a first option of the plurality of options using different bands for the concurrent transmissions, a second option of the plurality of options using different channels of a common band, and a third option of the plurality of options using a same channel.

12. The method of claim 11, wherein the selecting is based on one or more of (1) a capability of the wireless device, (2) specified preferences relating to one or more of enhancing throughput or enhancing power efficiency, or (3) whether the wireless device is already associated with an AP.

13. The method of claim 1, wherein the first transceiver is maintained in the active state of the first transceiver even though the at least one processor of the wireless device decided to not transmit over the first wireless link.

14. The method of claim 1, wherein the first transceiver is a first radio frequency (RF) transceiver, and the second transceiver is a second RF transceiver.

15. A wireless device comprising:
a first transceiver to transmit and receive information over a first wireless link with a first access point (AP), and a second transceiver to transmit and receive information over a second wireless link with a second AP, wherein the wireless device is to concurrently associate with both the first and second APs using an Institute of Electrical and Electronic Engineers (IEEE) 802.11 protocol, wherein the first AP is part of a first network and the second AP is part of a second network different and separate from the first network, and wherein one network of the first network and the second network is provided by a cellular network operator that has allocated the first network to offload communication of data traffic from a cellular network of the cellular network operator;
at least one processor configured to:
set each of the first and second transceivers in a respective active state so that the first and second transceivers are able to transmit and receive over the respective first and second wireless links;
while the first and second transceivers are each set in the respective active state, gate transmission of uplink information over the first wireless link between the wireless device and the first AP, in response to determining that the wireless device is receiving or is about to receive downlink information over the second wireless link from the second AP, wherein the gating of the transmission of uplink information over the first wireless link comprises controlling the first transceiver in the active state of the first transceiver to prevent transmission over the first wireless link.

16. The wireless device of claim 15, wherein the gating of the uplink information comprises aborting an uplink transmission in response to determining that the wireless device is receiving downlink information over the second wireless link from the second AP.

17. The wireless device of claim 15, wherein the at least one processor is configured to further:
determine that an uplink message is part of an atomic operation; and
in response to determining that the uplink message is part of the atomic operation, transmit the uplink message without performing gating of the uplink message.

18. The wireless device of claim 15, wherein the at least one processor is configured to maintain the first transceiver in the active state of the first transceiver even though the transmission of the uplink information over the first wireless link is gated.

19. The wireless device of claim 15, wherein the first transceiver is a first radio frequency (RF) transceiver, and the second transceiver is a second RF transceiver.

\* \* \* \* \*